United States Patent
Suryavanshi et al.

(10) Patent No.: US 9,398,411 B2
(45) Date of Patent: Jul. 19, 2016

(54) DISPATCH CONSOLE CLIENT FUNCTIONALITY

(71) Applicant: QUALCOMM Incorporated, San Diego, CA (US)

(72) Inventors: Vijay Anandrao Suryavanshi, San Diego, CA (US); Sandeep Sharma, San Diego, CA (US); Mohammed Ataur Rahman Shuman, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/723,077

(22) Filed: May 27, 2015

(65) Prior Publication Data
US 2016/0073231 A1 Mar. 10, 2016

Related U.S. Application Data

(60) Provisional application No. 62/046,816, filed on Sep. 5, 2014.

(51) Int. Cl.
| | |
|---|---|
| *H04W 24/00* | (2009.01) |
| *H04W 4/02* | (2009.01) |
| *H04W 4/08* | (2009.01) |
| *H04W 4/10* | (2009.01) |
| *H04L 29/06* | (2006.01) |
| *H04W 4/00* | (2009.01) |

(52) U.S. Cl.
CPC ........... *H04W 4/021* (2013.01); *H04L 65/4061* (2013.01); *H04W 4/08* (2013.01); *H04W 4/10* (2013.01); *H04W 4/001* (2013.01)

(58) Field of Classification Search
CPC .... H04L 5/0053; H04J 11/005; H04W 24/10; H04W 76/002; H04W 72/02; H04W 72/04
USPC ........................................................ 455/456.1
See application file for complete search history.

(56) References Cited

U.S. PATENT DOCUMENTS

| | | | |
|---|---|---|---|
| 6,885,874 | B2 | 4/2005 | Grube et al. |
| 8,320,931 | B2 | 11/2012 | Ward et al. |
| 2002/0197994 | A1* | 12/2002 | Harris ............... H04W 4/10 455/445 |
| 2006/0003784 | A1* | 1/2006 | Chion ............... H04W 4/10 455/518 |
| 2006/0294243 | A1* | 12/2006 | Kuure ............ H04L 63/104 709/227 |
| 2007/0265015 | A1* | 11/2007 | Lagerman ......... H04W 72/005 455/452.1 |
| 2009/0233629 | A1 | 9/2009 | Jayanthi |
| 2010/0248742 | A1 | 9/2010 | Song et al. |

(Continued)

FOREIGN PATENT DOCUMENTS

WO 2009088823 A2 7/2009

OTHER PUBLICATIONS

International Search Report and Written Opinion—PCT/US2015/047965—ISA/EPO—Nov. 3, 2015.

*Primary Examiner* — Don N Vo
(74) *Attorney, Agent, or Firm* — Muncy, Geissler, Olds & Lowe, P.C.

(57) ABSTRACT

Systems and methods are disclosed for setting a control zone configuration for members of a communication group. A dispatcher device establishes a geofence associated with a geographic area including one or more members of the communication group, determines the control zone configuration for members of the communication group within the geofence, and sends the control zone configuration to the one or more members of the communication group.

30 Claims, 16 Drawing Sheets

(56) References Cited

U.S. PATENT DOCUMENTS

| | | | |
|---|---|---|---|
| 2010/0260108 A1 * | 10/2010 | Song | H04W 72/04 370/328 |
| 2012/0077536 A1 | 3/2012 | Goel et al. | |
| 2013/0203440 A1 | 8/2013 | Bilange et al. | |
| 2014/0045472 A1 | 2/2014 | Sharma et al. | |

* cited by examiner

DISPATCH CONSOLE CLIENT FUNCTIONALITY

CROSS-REFERENCE TO RELATED APPLICATIONS

The present Application for Patent claims the benefit of U.S. Provisional Application No. 62/046,816, entitled "DISPATCH CONSOLE CLIENT FUNCTIONALITY," filed Sep. 5, 2014, assigned to the assignee hereof, and expressly incorporated herein by reference in its entirety.

BACKGROUND

Embodiments of the disclosure relate to dispatch console client functionality.

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long-Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

In a full duplex communication system, such as a cellular communication system, all parties on a call can communicate simultaneously because there is a two-way communication channel between them. In contrast, in a half-duplex communication system, communication among the parties is permitted in only one direction at a time. That is, when one party is transmitting, the other parties cannot transmit, but rather, can only receive the transmission.

An example of half-duplex communication is Push-to-Talk (PTT), where a momentary button press switches from a voice or media reception mode to a voice or media transmit mode (referred to as transmitting a "talk spurt"). Two-way radios, or "walkie-talkies," utilize half-duplex communication. PTT over Cellular (PoC) is a communication service in a cellular network that allows subscribers to use their cell phones as PTT devices. PoC and other PTT-like services, such as Push-to-X (PTX), also allow participants to transmit non-voice media (e.g., images, videos, sound files, location, etc.) in addition to voice media.

A significant advantage of PTT and PTT-like services is the ability to connect multiple participants in a group communication. A single user can reach an active communication group with a single button press; users need not make several calls to coordinate with a group.

SUMMARY

The following presents a simplified summary relating to one or more aspects and/or embodiments associated with the mechanisms disclosed herein for dispatch console client functionality, such as setting a control zone configuration for members of a communication group. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below A method for setting a control zone configuration for members of a communication group includes establishing, by a dispatcher device, a geofence associated with a geographic area including one or more members of the communication group, determining the control zone configuration for members of the communication group within the geofence, and sending the control zone configuration to the one or more members of the communication group.

An apparatus for setting a control zone configuration for members of a communication group includes a processor configured to establish a geofence, the geofence associated with a geographic area including one or more members of the communication group, and to determine the control zone configuration for members of the communication group within the geofence, and a transceiver configured to send the control zone configuration to the one or more members of the communication group.

An apparatus for setting a control zone configuration for members of a communication group includes means for establishing a geofence, the geofence associated with a geographic area including one or more members of the communication group, means for determining the control zone configuration for members of the communication group within the geofence, and means for sending the control zone configuration to the one or more members of the communication group.

A non-transitory computer-readable medium for setting a control zone configuration for members of a communication group includes at least one instruction to establish, by a dispatcher device, a geofence, the geofence associated with a geographic area including one or more members of the communication group, at least one instruction to determine, by the dispatcher device, the control zone configuration for members of the communication group within the geofence, and at least one instruction to send, by the dispatcher device, the control zone configuration to the one or more members of the communication group.

Other objects and advantages associated with the mechanisms disclosed herein to set a control zone configuration for members of a communication group described herein will be apparent to those skilled in the art based on the accompanying drawings and detailed description.

BRIEF DESCRIPTION OF THE DRAWINGS

A more complete appreciation of embodiments of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
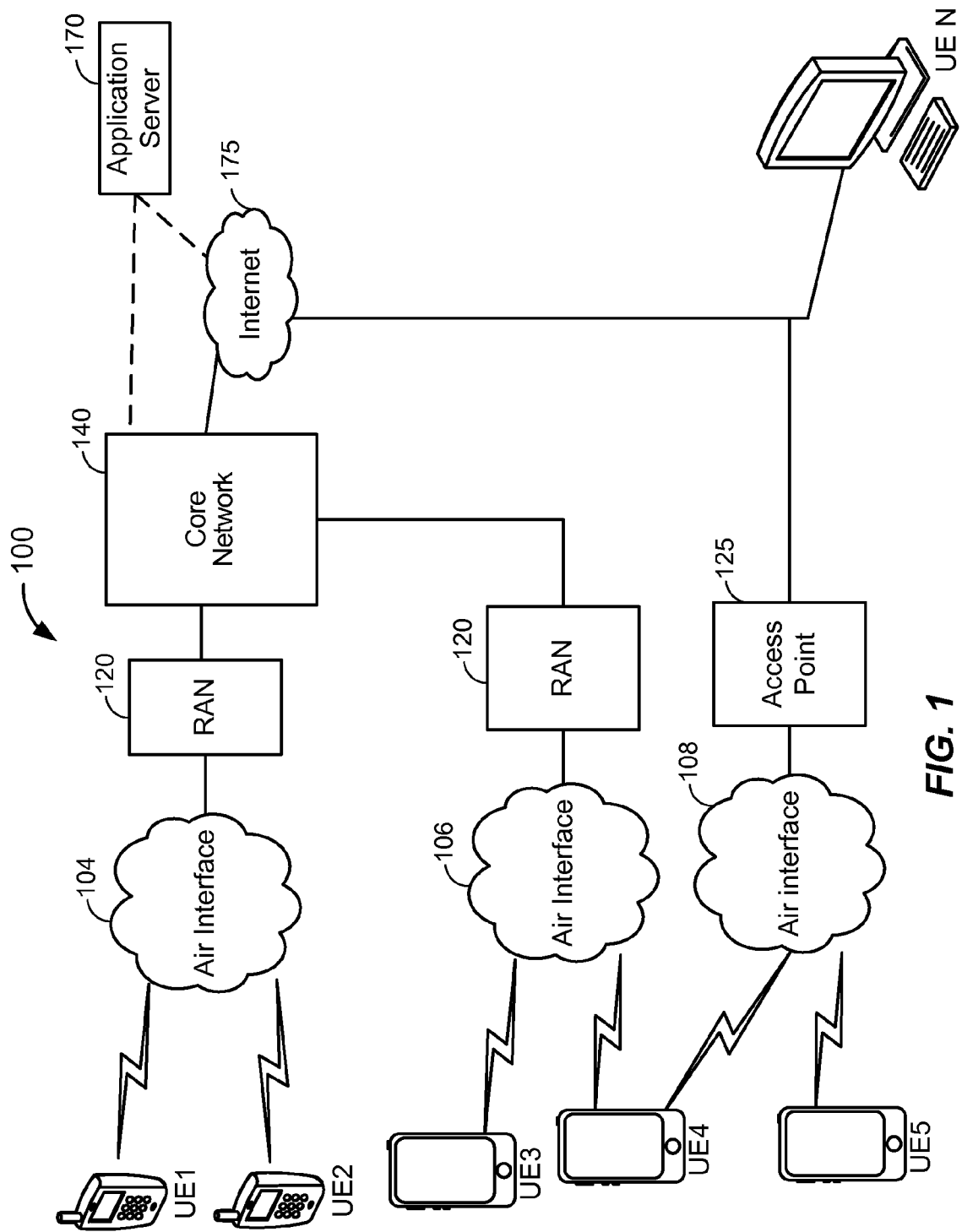
FIG. 1 illustrates a high-level system architecture of a wireless communications system in accordance with an embodiment of the disclosure.

Systems and methods are disclosed for setting a control zone configuration for members of a communication group. A dispatcher device establishes a geofence associated with a geographic area including one or more members of the communication group, determines the control zone configuration for members of the communication group within the geofence, and sends the control zone configuration to the one or more members of the communication group These and other aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175, and/or to provide content (e.g., web page downloads) to the UEs.

Figure 2:
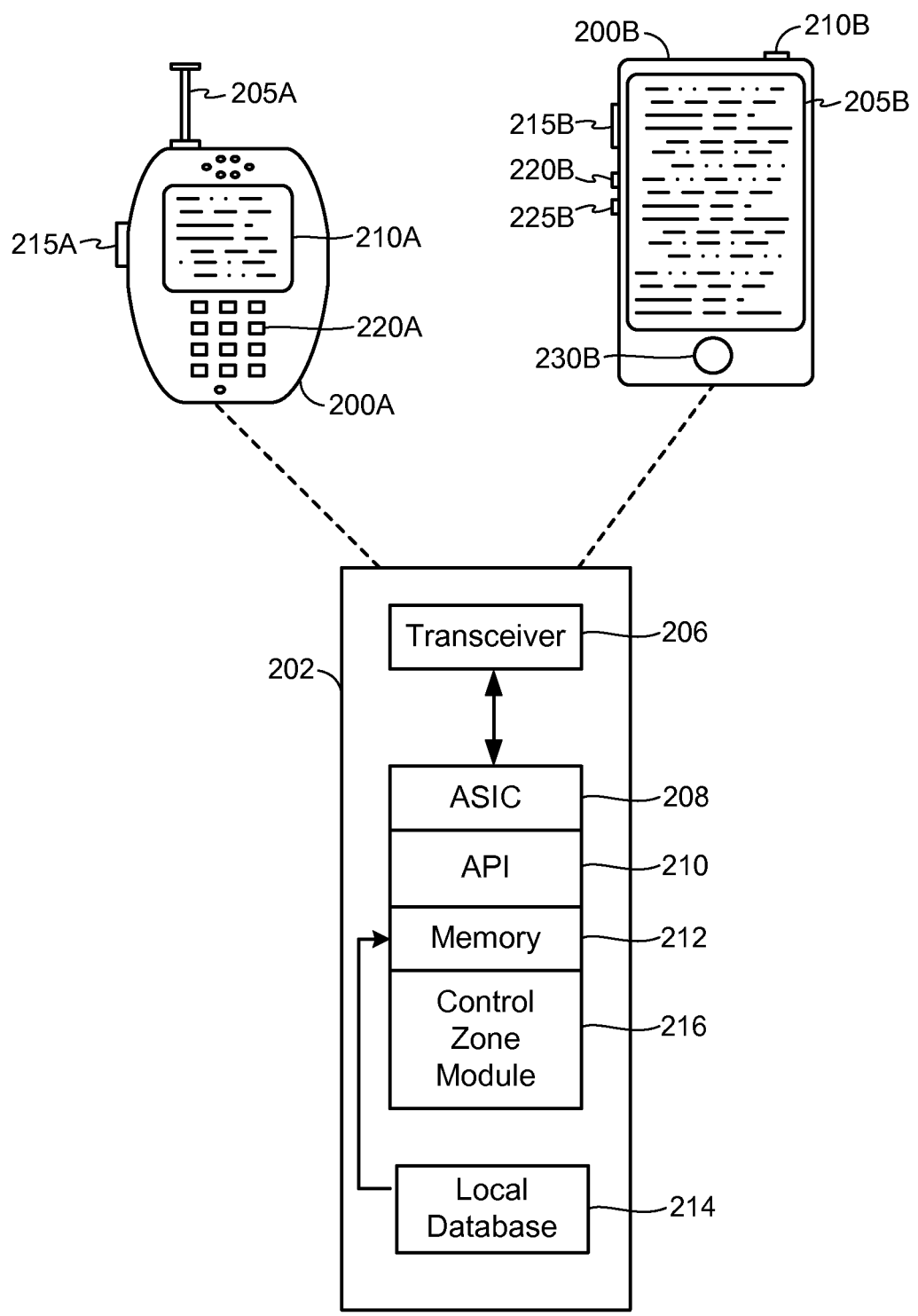
FIG. 2 illustrates examples of user equipments (UEs) in accordance with embodiments of the disclosure.

FIG. 2 illustrates examples of UEs (i.e., client devices) in accordance with embodiments of the disclosure. Referring to FIG. 2, UE 200A is illustrated as a calling telephone and UE 200B is illustrated as a touchscreen device (e.g., a smart phone, a tablet computer, etc.). In an example, the UE 200B may correspond to a dispatcher device, as described herein, and the UE 200A may correspond to a PTT client device of the dispatcher device, as described herein. Alternatively, both the dispatcher device and a PTT client device may be touchscreen devices, such as UE 200B, as described herein.

As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like. The platform 202 may also include a control zone module 216, which may be stored in memory 212 and executable by ASIC 208, or may be a hardware or firmware component coupled to or integrated into ASIC 208.

Accordingly, an embodiment of the disclosure can include a UE (e.g., UE 200A, 200B, etc.) including the ability to perform the functions described herein, such as setting a control zone configuration for members of a communication group. As will be appreciated by those skilled in the art, the various logic elements can be embodied in discrete elements, software modules executed on a processor or any combination of software and hardware to achieve the functionality disclosed herein. For example, ASIC 208, memory 212, API 210, local database 214, and/or control zone module 216 may all be used cooperatively to load, store and execute the various functions disclosed herein and thus the logic to perform these functions may be distributed over various elements. Alternatively, the functionality could be incorporated into one discrete component, such as the control zone module 216. Therefore, the features of the UEs 200A and 200B in FIG. 2 are to be considered merely illustrative and the disclosure is not limited to the illustrated features or arrangement.

The control zone module 216 may have different functionality depending on whether it is implemented by a dispatcher device, e.g., UE 200B, or a client device of the dispatcher device, e.g., UE 200A. For example, in an aspect, where the control zone module 216 is implemented by a dispatcher device, the control zone module 216 cooperatively with the ASIC 208 and the API 210 may be configured to establish a geofence associated with a geographic area including one or more members of the communication group, as described herein. The control zone module 216 in conjunction with the ASIC 208 may be further configured to determine a control zone configuration for members of the communication group within the geofence, as described herein. The transceiver 206 cooperatively with the control zone module 216 and the ASIC 208 may be configured to send the control zone configuration to the one or more members of the communication group, as described herein.

The transceiver 206 cooperatively with the control zone module 216 and the ASIC 208 may also be configured to send a location request to the one or more members of the communication group and to receive location updates from each of the one or more members of the communication group based on a location update frequency. The touchscreen display 205B cooperatively with the control zone module 216, the ASIC 208, and/or the API 210 may be configured to display locations of the one or more members of the communication group on a map representing the geofence and to update a user interface showing locations of the one or more members of the communication group within the geofence with the received location updates.

However, where the control zone module 216 is implemented by a client device of the dispatcher device, such as a member of the above-described communication group, the transceiver 206 and the control zone module 216 in conjunction with the ASIC 208 may be configured to receive control zone configuration from the dispatcher device. The control zone module 216 in conjunction with the ASIC 208 may be configured to cause the client device to operate in accordance with the control zone information. Additionally, the transceiver 206 and the control zone module 216 in conjunction with the ASIC 208 may be configured to send location updates to the dispatcher device.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the disclosure and are merely to aid in the description of aspects of embodiments of the disclosure.

Figure 3:
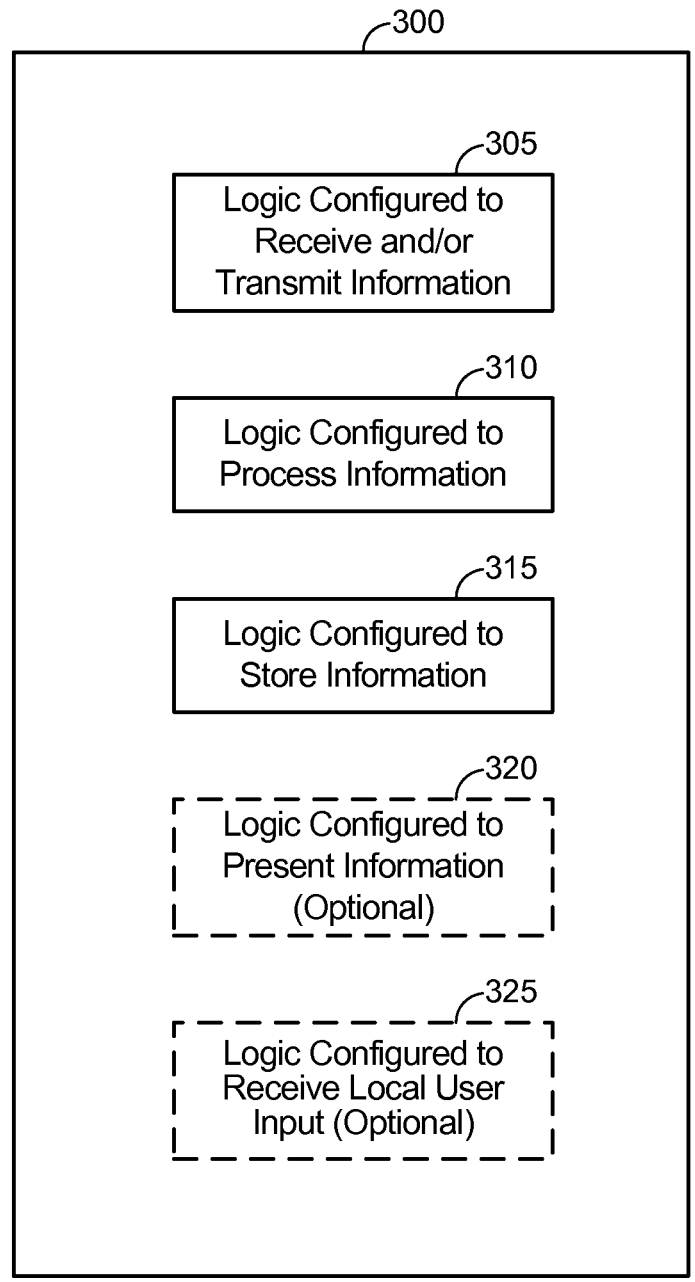
FIG. 3 illustrates a communication device that includes logic configured to perform functionality in accordance with an embodiment of the disclosure.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the application server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B, AP 125, a BS, Node B or eNodeB in the RAN 120, etc.), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., application server 170, etc.), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM memory, flash memory, ROM memory, EPROM memory, EEPROM memory, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers such as the application server 170, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers such as the application server 170, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Where the communication device 300 is configured to set a control zone configuration for members of a communication group, the logic configured to receive local user input 325 in conjunction with the logic configured to process information 310 may be configured to establish a geofence associated with a geographic area including one or more members of the communication group. The logic configured to process information 310 may further be configured to determine the control zone configuration for members of the communication group within the geofence. The logic configured to process information 310 and the logic configured to receive and/or transmit information 305 may be configured to send the control zone configuration to the one or more members of the communication group. Similarly, where the communication device 300 is a member of the communication group and configured to receive a control zone configuration from a dispatcher device, the logic configured to receive and/or transmit information 305 in conjunction with the logic configured to process information 310 may be configured to receive the control zone configuration from the dispatcher device. The logic configured to process information 310 may be configured to cause the communication device 300 to operate in accordance with the control zone information. Additionally, the logic configured to receive and/or transmit information 305 in conjunction with the logic configured to process information 310 may be configured to send location updates to the dispatcher device.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 4:
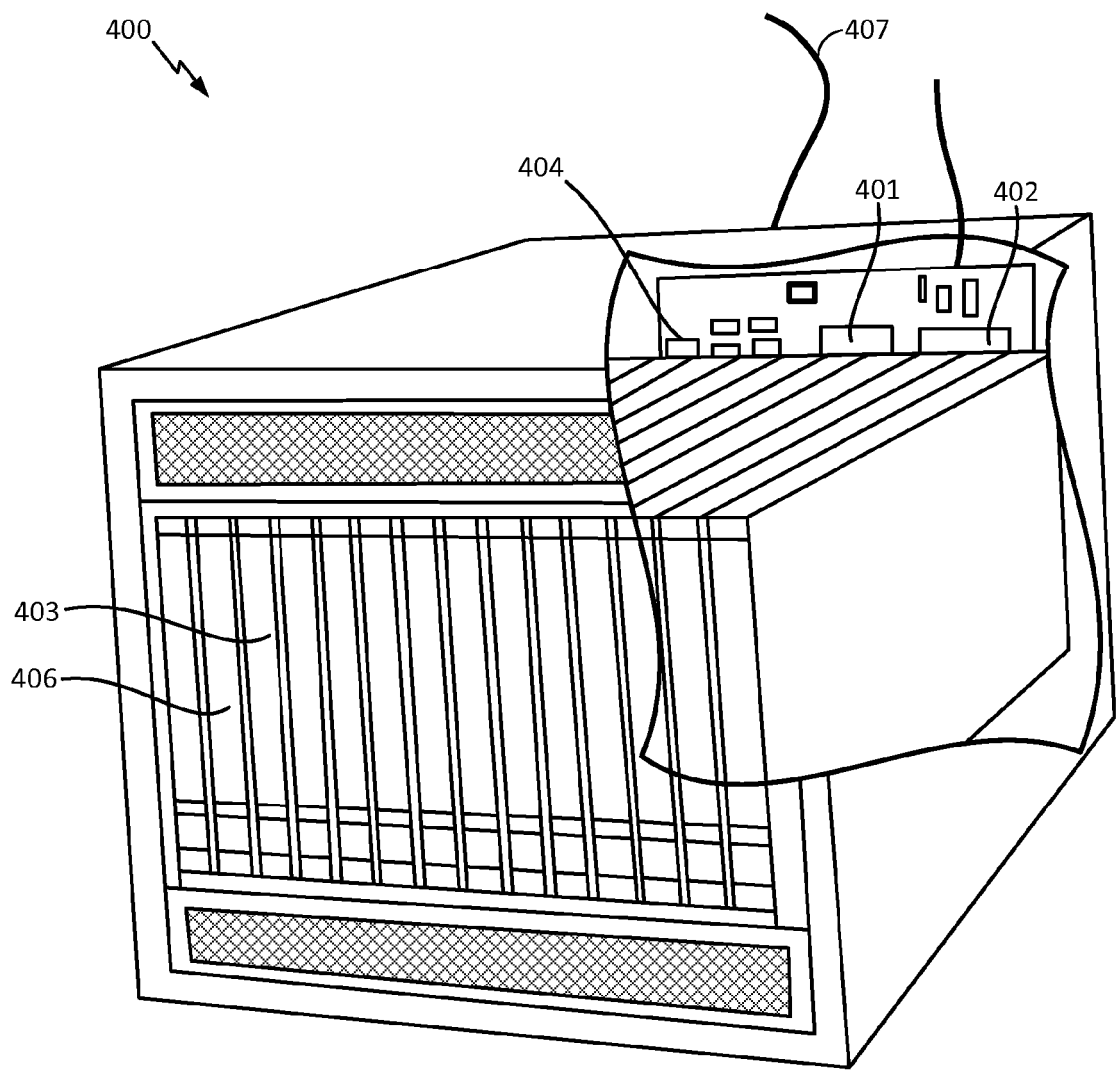
FIG. 4 illustrates a server in accordance with an embodiment of the disclosure.

The various embodiments may be implemented on any of a variety of commercially available server devices, such as server 400 illustrated in FIG. 4. In an example, the server 400 may correspond to one example configuration of the application server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access ports 304 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to a UE implementation as in 205A or 205B as in FIG. 2.

The server 400 may be configured to facilitate a dispatcher device setting a control zone configuration for members of a communication group. For example, the server 400 may be configured to receive a control zone configuration for members of a communication group from the dispatcher device, and to send the control zone configuration to the one or more members of the communication group. The server 400 may be further configured to receive location updates from the members of the communication group and forward them to the dispatcher device. The server 400 may include other functionality related to setting a control zone configuration for members of a communication group, as described further herein.

As discussed above, a significant advantage of PTT/PoC/PTX is the ability to connect multiple participants in a group communication. As used herein, the term PTT encompasses any PTT-like service, such as PoC, PTX, etc. In a PTT group communication, there may be a dispatch PTT console client (also referred to as the "dispatcher"). The dispatch console client is a PTT client that administers or supervises other PTT clients in the communication group.

The present disclosure proposes a dispatch console client operating from a touchscreen device, such as a smartphone or tablet computer, that can send signaling messages to the group members (also referred to as "PTT clients," "clients," "users," etc.) to control the features available to those members. For example, the dispatcher or originator may allow only a subset of group members to take the floor, such that all other members may continue to listen to the talk spurts but are not able to take the floor. As another example, the dispatcher may allow only a subset of group members to send or originate non-voice media transmissions (e.g., media share, location, text, etc.). As yet another example, the dispatcher may mute the capabilities and/or applications on target members' devices, either at the time the call starts or at some point during the call.

The dispatcher is initially pre-provisioned with group information for various closed groups in which the dispatcher is interested. The application server, such as application server 170 in FIG. 1, is pre-provisioned with closed group information. When an originator attempts to initiate a closed group call, the application server will allow the closed group call only if the originator is part of the closed group membership. Where the dispatcher is a member of a closed group, it can receive the name of the closed group via its UI (from the user) and initiate a group call among the members of the closed group. Where a downloadable application (DLA) client is a member of a closed group, it can also receive the closed group name via the UI.

Note, there are two ways to deliver PTT services. One is with an embedded device where the original equipment manufacturer (OEM) integrates the PTT application into the device. These are typically bulky devices with a specialized PTT button, such as UE 200A in FIG. 2. The second is a downloadable application that can be installed on any smartphone, such as UE 200B in FIG. 2. Such a smartphone is referred to herein as a "DLA client." Members of the closed groups described herein may be either OEM PTT devices or DLA clients.

Figure 5A:
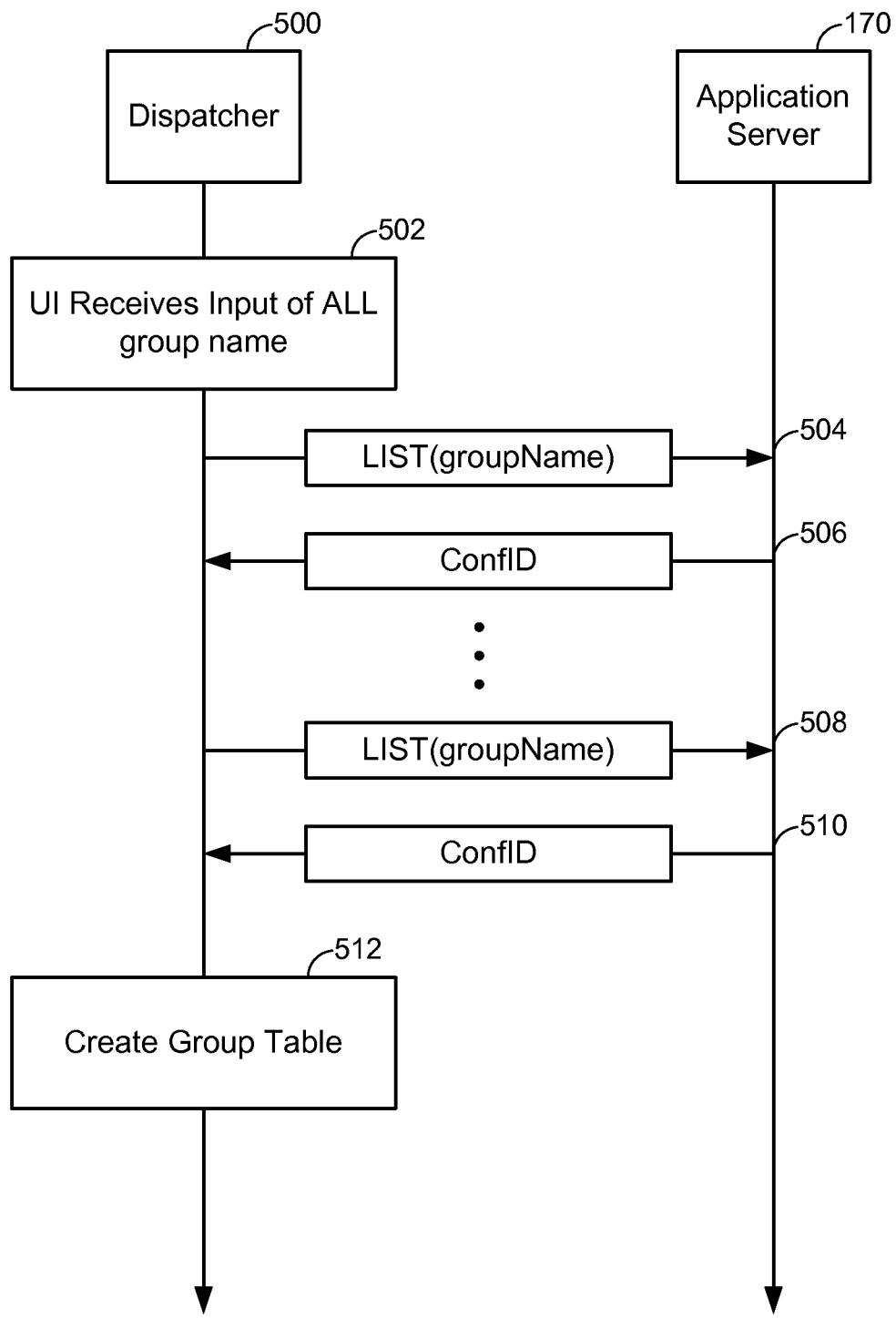
FIG. 5A illustrates an exemplary flow of the interaction between a dispatcher and an application server in accordance with an embodiment of the disclosure.

FIG. 5A illustrates an exemplary flow of the interaction between a dispatcher 500, which may correspond to UE 200B in FIG. 2, and the application server 170 to pre-provision the dispatcher 500 with the list of closed groups to which the dispatcher 500 is a member and in which the dispatcher 500 is interested. The dispatcher 500 may be any UE with a touchscreen, such as UE 200B in FIG. 2.

At 502, the UI of the dispatcher 500 receives input from the user of all the group names in which the user, and thus the dispatcher 500, is interested, and of which the dispatcher 500 may be a member. At 504, the dispatcher sends a LIST query with the first group name in which the user/dispatcher 500 is interested to the application server 170. At 506, the application server 170 responds with a confirmation identifier (confID) for the group, confirming whether or not the dispatcher 500 is a member of that closed group.

The dispatcher 500 sends as many LIST queries to the application server 170 as the dispatcher 500 received group names from the user. At 508, the dispatcher 500 sends the final LIST query, and at 510, the application server 170 responds with a final confirmation identifier.

At 512, the dispatcher 500 creates a group table of the closed groups of which the dispatcher 500 is a member and in which the dispatcher 500 is interested, thereby performing self-provisioning. For example, the dispatcher 500 may create an entry in the group table such as "g.00=groupName1: ConfID1," where "g.00" indicates the entry number, "groupName1" is the name of the closed group, and "ConfID1" is the response from the application server 170 indicating whether or not the dispatcher 500 is a member of the group. The group table allows the dispatcher 500 to perform the functionality described herein.

Figure 5B:
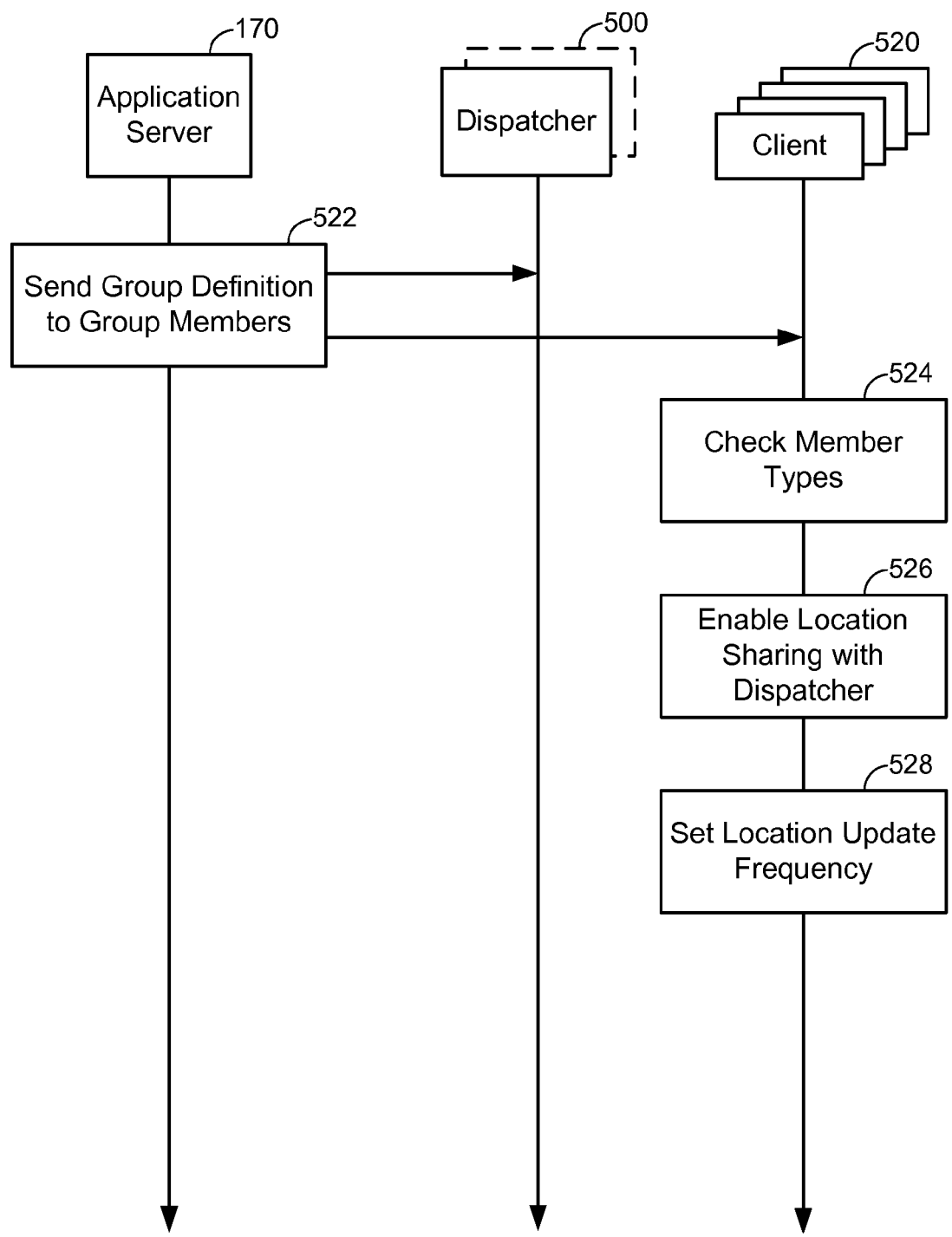
FIG. 5B illustrates an exemplary flow in which the application server provisions the members of a given closed group with a group definition in accordance with an embodiment of the disclosure.

As illustrated in FIG. 5B, the application server 170 can provision the members of a given closed group with a group definition that includes identifiers of the group members, including one or more dispatchers 500, and the corresponding type of each group member. At 522, the application server 170 sends the group definition to the dispatcher(s) 500 and each group member/client 520, which may correspond to UEs 200A/200B in FIG. 2. At 524, the clients 520 expand the group membership and check the types of the members. For group members that have a member type of "dispatcher" (there may be more than one), at 526, the clients 520 enable location sharing with the corresponding device(s). The clients 520 may enable location sharing with only the dispatcher(s) 500 so that only the dispatcher(s) 500 know the locations of the clients 520. At 528, the clients 520 set their location update frequency. The location update frequency may be f(1/d), where d is the distance between the client 520 and the dispatcher(s) 500, for example. Using the location of the dispatcher(s) 500 may require querying the application server 170 or the dispatcher(s) 500 for the current or last known location of the dispatcher(s) 500.

Where there are multiple dispatchers 500, the clients 520 set location update frequencies per dispatcher. For example, a client 520 may send location updates to a first dispatcher at a frequency of f(1/d1), where d1 is the distance between the client and the first dispatcher, and to a second dispatcher at a frequency of f(1/d2), where d2 is the distance between the client and the second dispatcher.

Also when there are multiple dispatchers 500, the dispatchers 500 may choose to share their locations with each other as well, as the clients 520 do at 526 and 528. For example, there may be a mobile dispatcher on-site managing a local group of target clients in conjunction with a static dispatcher at the company's headquarters. In that case, both dispatchers may wish to share location updates with each other.

Figure 6:
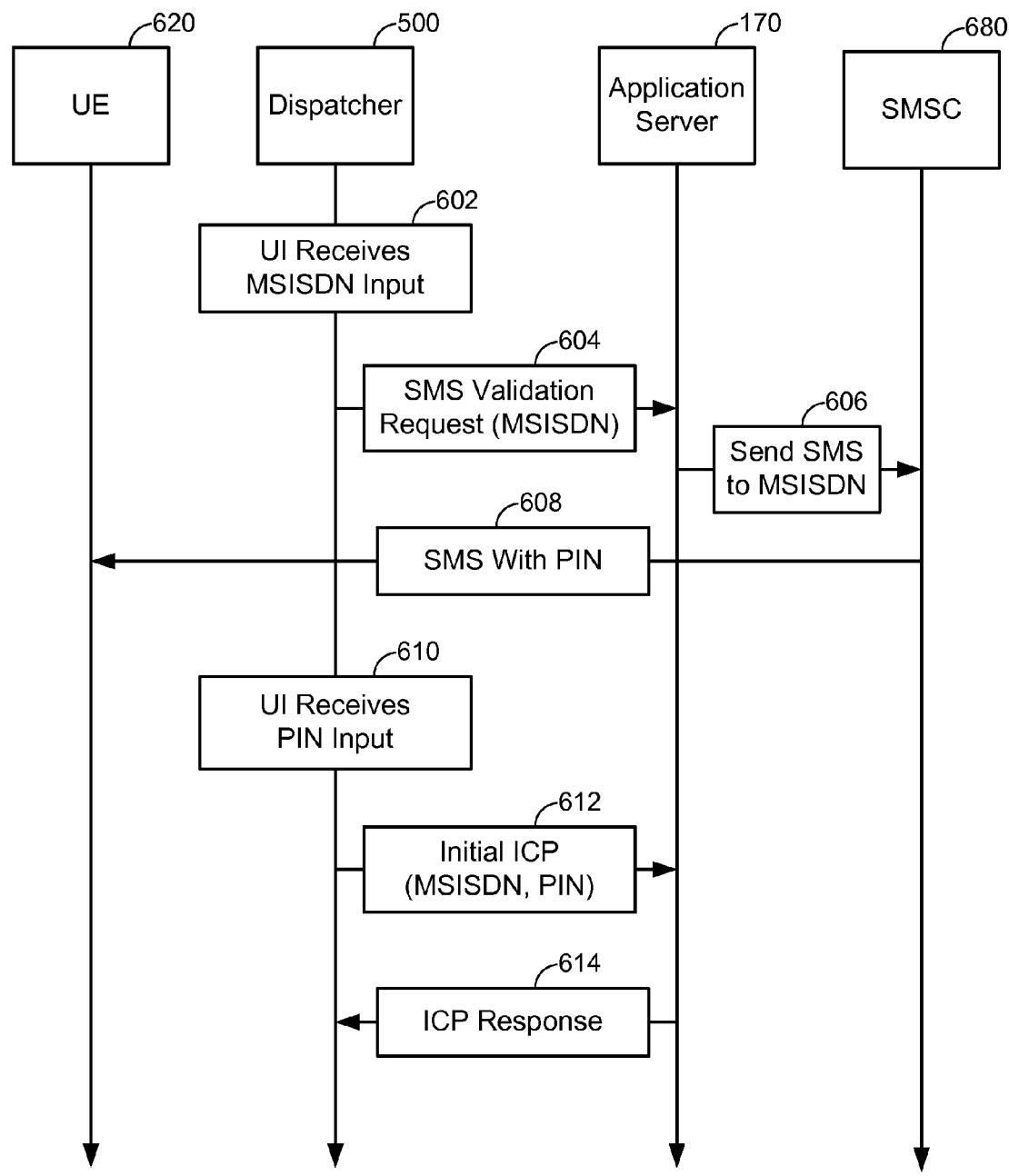
FIG. 6 illustrates an exemplary flow for Internal Client Provisioning (ICP) in accordance with an embodiment of the disclosure.

FIG. 6 illustrates an exemplary flow for Internal Client Provisioning (ICP) according to an aspect of the disclosure. ICP is a form of client provisioning where the application server 170 uses HTTP to provision the client, here, the UE 620, with an authentication key and all other necessary provisioning parameters so that the client/UE 620 can access services from the application server 170.

In the example of FIG. 6, the UE 620, which may correspond to UE 200A/200B in FIG. 2, is a member of a closed group of which the dispatcher 500 is also a member. The dispatcher 500 performs the flow illustrated in FIG. 6 when it does not have a Subscriber Identity Module (SIM) card or an International Mobile Subscriber Identity (IMSI).

At 602, the UI of the dispatcher 500 receives the Mobile Station International Subscriber Directory Number (MSISDN) of UE 620. The dispatcher 500 may receive the MSISDN from the user or from the UE 620. At 604, the dispatcher 500 sends a Short Message Service (SMS) validation request that includes the MSISDN to the application server 170. At 606, the application server 170 instructs the Short Message Service Center (SMSC) 680 to send a validation SMS to the MSISDN. At 608, the SMSC 680 sends a SMS message with a personal identification number (PIN) to the UE 620.

The UE 620 receives the PIN and the PIN needs to be entered on the dispatcher 500 to complete the ICP loop. At 610, the UI of the dispatcher 500 receives the PIN sent to the UE 620. The dispatcher 500 may receive the PIN from the user or from the UE 620. At 612, the dispatcher 500 sends an initial ICP request that includes the MSISDN and the PIN to the application server 170. At 614, the application server 170 sends an ICP response to the dispatcher 500. The flow illustrated in FIG. 6 is then followed by the typical dispatcher 500 registration with the application server 170.

Figure 7:
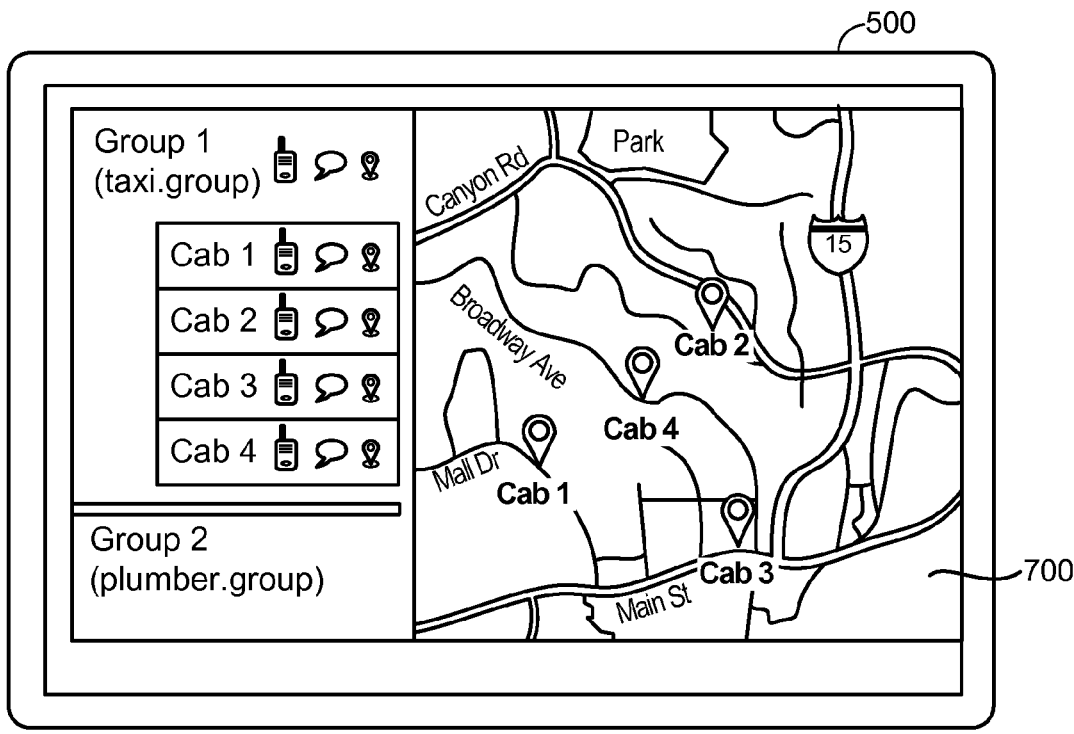
FIG. 7 illustrates an exemplary user interface of the dispatcher after the UE's are successfully provisioned and the dispatcher registers with the application server in accordance with an embodiment of the disclosure.

FIG. 7 illustrates an exemplary user interface 700 of the dispatcher 500 after the UE's are successfully provisioned and the dispatcher 500 registers with the application server 170. The UI 700 shows the first closed group (or the default closed group when the UI 700 launches) with group details. The details of any other closed groups are not shown, but the group name may be. In the example of FIG. 7, the first closed group is "taxi.group," which may be a group of taxi drivers for a particular cab service, and only the name of the second closed group (e.g., "plumber.group") is shown.

To populate the map on UI 700 with the locations of the group members, the dispatcher 500 can initiate an individual Media Share request towards the members of the closed group. Each Media Share request contains a request for the location information of the member. The members respond with their location via another Media Share message.

Figure 8:
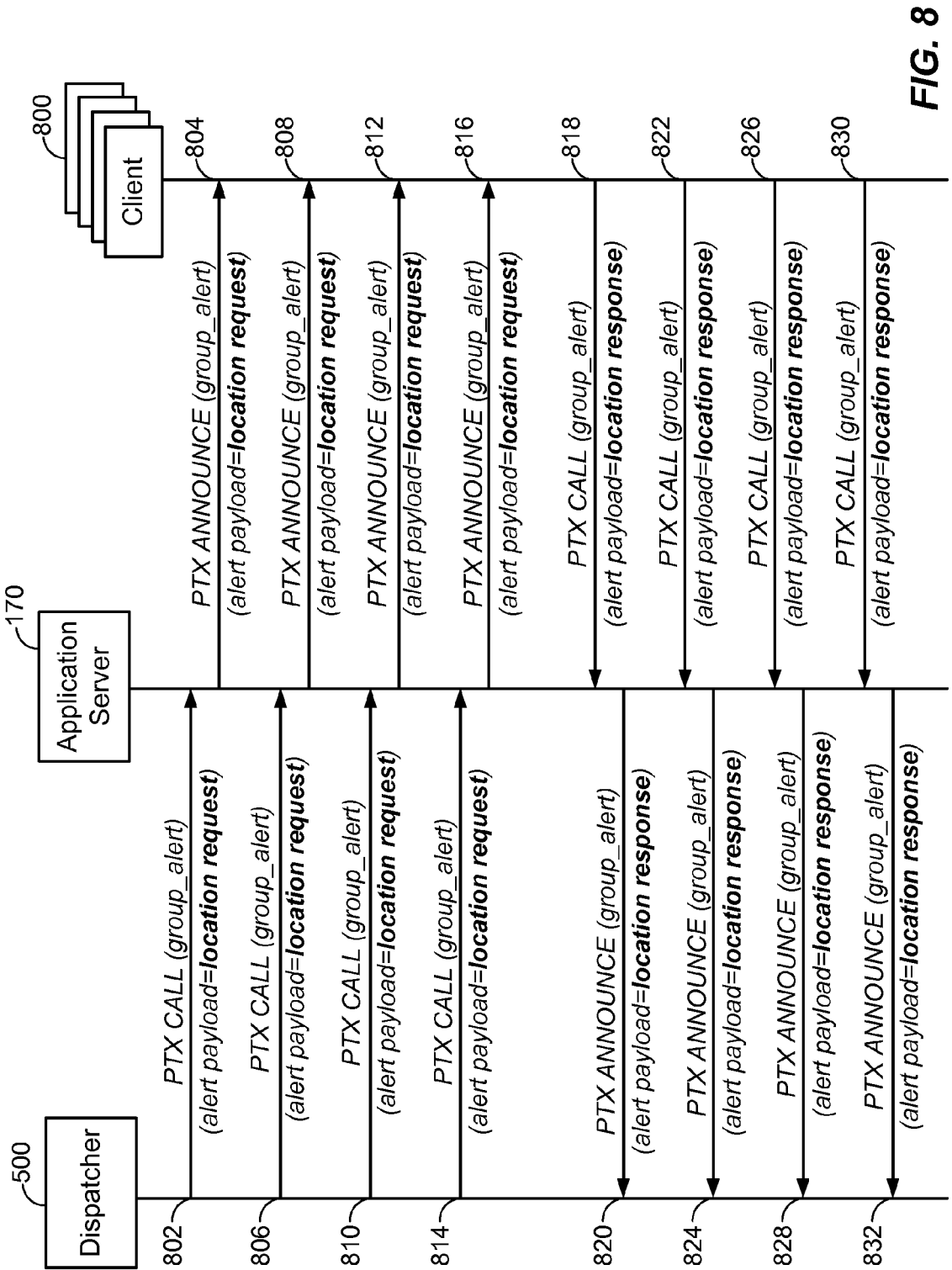
FIG. 8 illustrates an exemplary flow of a location request-response via a small media sharing application/protocol/interface to populate the user interface of the dispatcher with the locations of the members of the selected closed group in accordance with an embodiment of the disclosure.

FIG. 8 illustrates an exemplary flow of a location request-response via a small media sharing application/protocol/interface to populate the UI of the dispatcher 500 with the locations of the members of the selected closed group. In context with FIG. 7, for example, the UI 700 would be populated with the locations of the members of Group 1 based on the dispatcher 500 performing the flow illustrated in FIG. 8.

From 802 to 816, the dispatcher 500 sends individual media share requests to the group members/clients 800 via the application server 170 requesting their location information. From 818 to 832, upon receiving the media share requests for their location, the clients 800 initiate another media share transaction conveying their location information to the dispatcher 500 via the application server 170 in the payload of the small media sharing message. Upon receiving the location information, the dispatcher 500 can populate the UI with the location information associated with each member.

Figure 9:
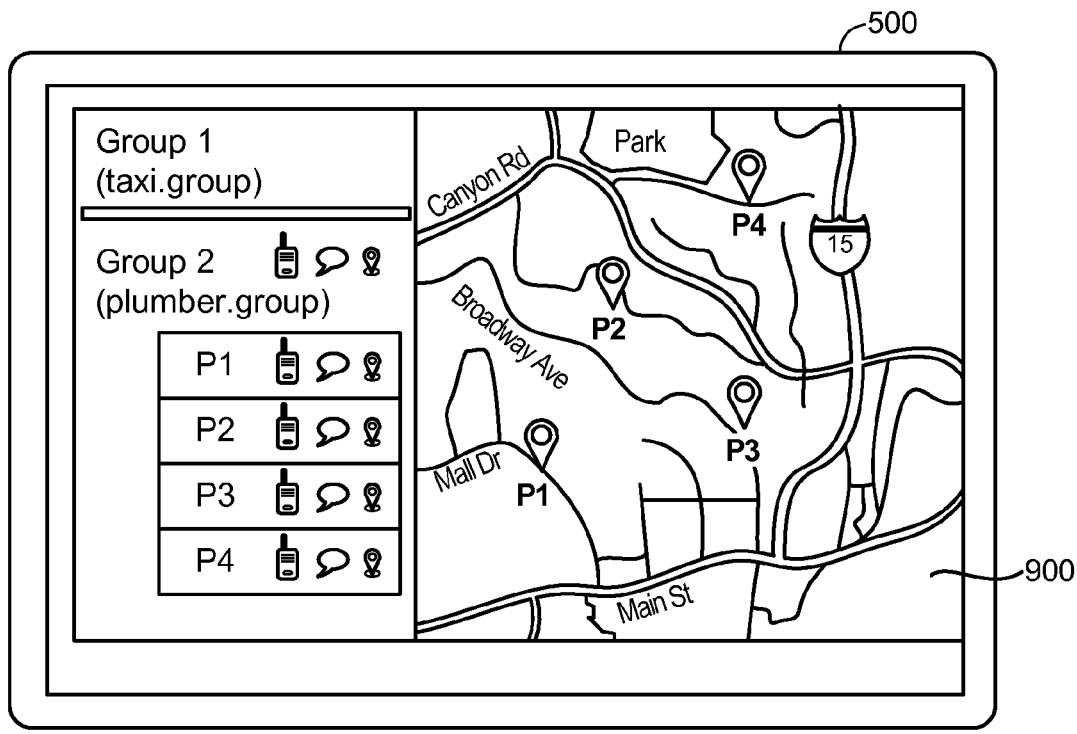
FIG. 9 illustrates an exemplary user interface of the dispatcher when another closed group is selected by the user in accordance with an embodiment of the disclosure.

FIG. 9 illustrates an exemplary user interface 900 of the dispatcher 500 when another closed group is selected by the user. When the user selects another group, such as Group 2 in the example of FIG. 9, the dispatcher 500 sends media share location requests to and receives location information from the members of Group 2, as described with reference to FIG. 8. Specifically, the UI 900 is populated with the locations of the members of Group 2 based on the dispatcher 500 performing the flow illustrated in FIG. 8.

Figure 10:
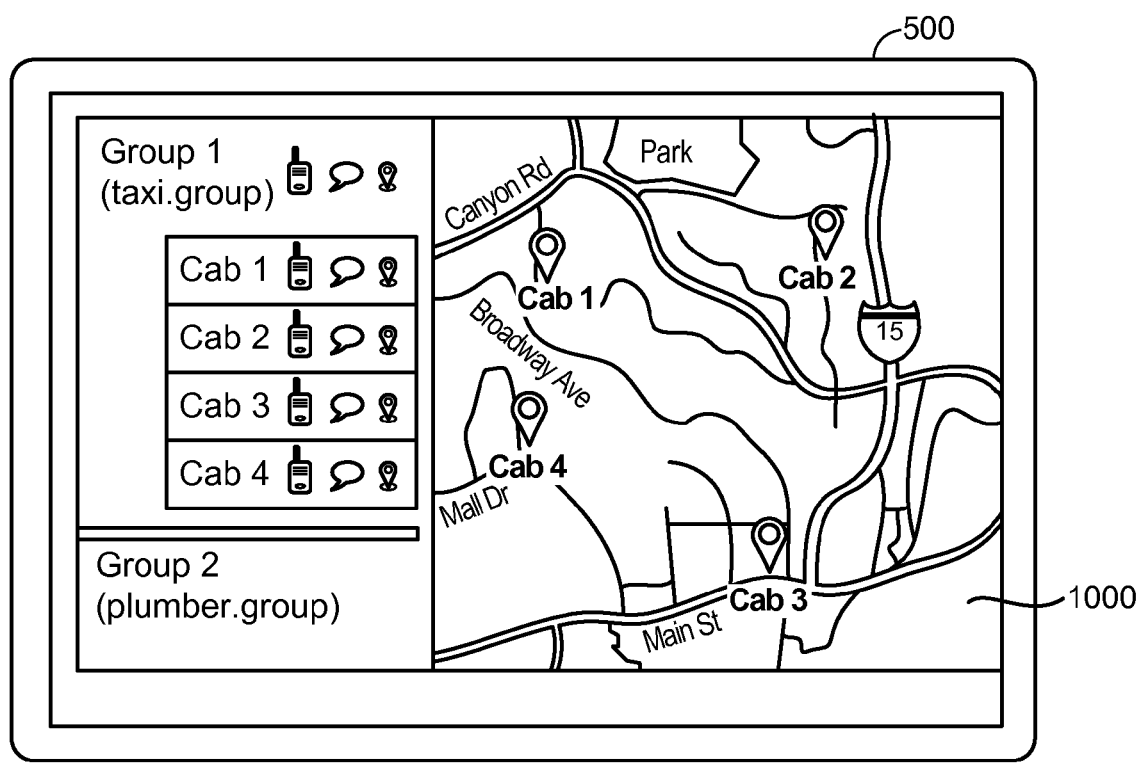
FIG. 10 illustrates an exemplary user interface of the dispatcher when a closed group is reselected by the user in accordance with an embodiment of the disclosure.

FIG. 10 illustrates an exemplary user interface 1000 of the dispatcher 500 when the first closed group is reselected by the user. In the case where the dispatcher 500 reselects a previous group (i.e., Group 1 in the example of FIG. 10), the dispatcher 500 sends media share location requests to and receives location information from the members of Group 1, as described with reference to FIG. 8. Specifically, the UI 1000 is populated with the updated locations of the members of Group 1 based on the dispatcher 500 performing the flow illustrated in FIG. 8.

Figure 11:
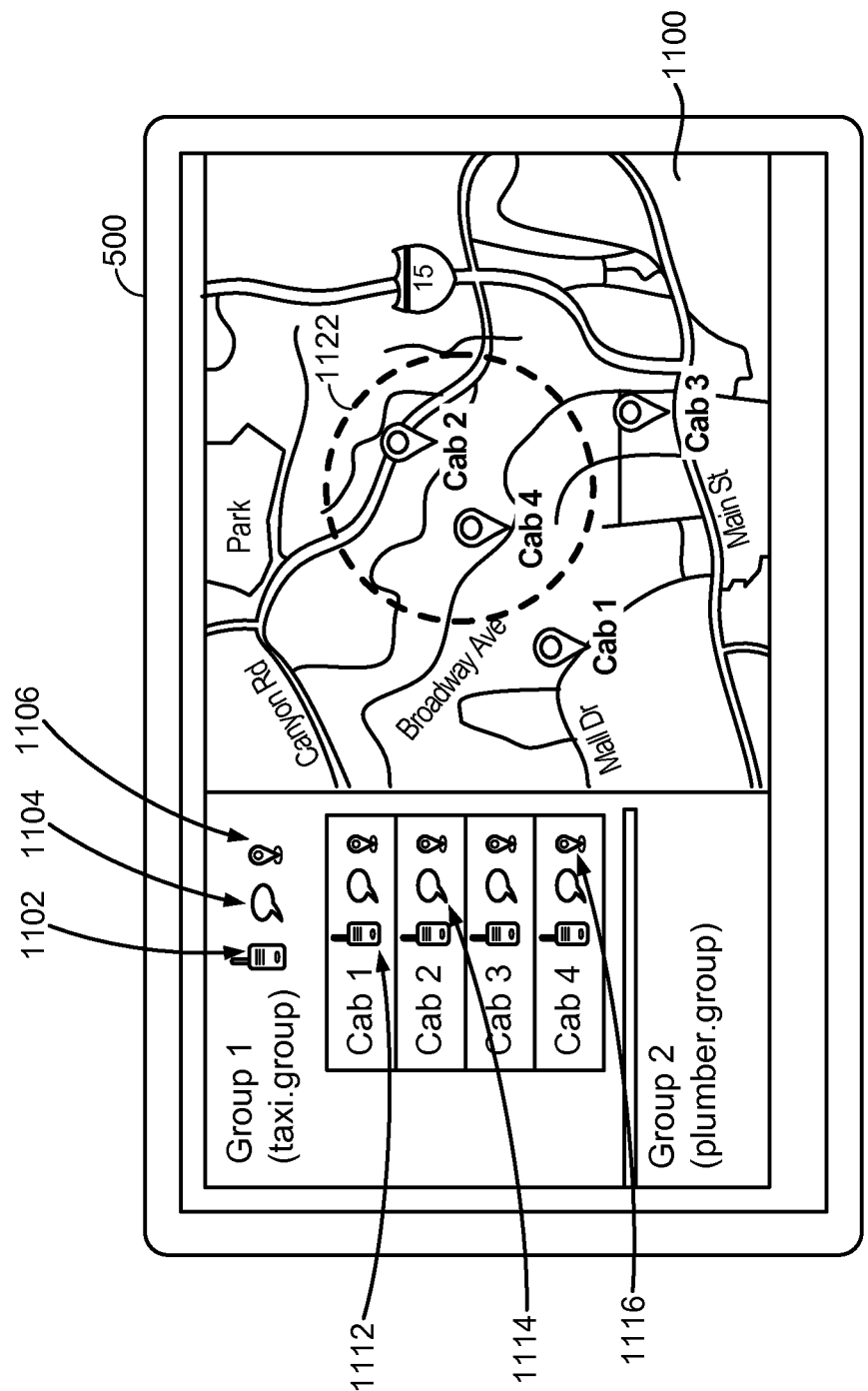
FIG. 11 illustrates an exemplary user interface of the dispatcher showing various icons in accordance with an embodiment of the disclosure.

FIG. 11 illustrates an exemplary user interface 1100 of the dispatcher 500 showing various icons. The user of the dispatcher 500 may select icon 1102 to initiate a group PTT call, icon 1104 to initiate a group media share (such as a text messages via a small message payload), or icon 1106 to initiate a group location request. The flow illustrated in FIG. 8 may also be triggered by the user selecting the icon 1106.

The user may also communicate with specific group members, not just the entire group. Specifically, the user may select icon 1112 to initiate an individual PTT call, icon 1114 to initiate an individual media share (such as a text messages via a small message payload), or icon 1116 to initiate an individual location request. The flow illustrated in FIG. 8 may also be triggered by the user selecting the icon 1116. For an individual location request, however, the flow illustrated in FIG. 8 would be performed only for that member.

Although FIGS. 7-11 illustrate four non-dispatcher group members, as is apparent, there may be any number of such group members.

The dispatcher 500 can transition between PTT group calls. If the dispatcher 500 is currently in a PTT session with Group 1, for example, the dispatcher 500 can initiate a PTT session with another group (e.g., Group 2). In that case, the PTT session with Group 1 is terminated, or possibly suspended. If the PTT session with Group 1 is being terminated, the dispatcher 500 sends a PTT END user exit message resulting in ending the call with Group 1. The new PTT group call is then setup with Group 2.

The dispatcher 500, or a call originator, may also disable or mute features and/or applications on target clients/members.

For example, the dispatcher 500 or the originator may allow only a subset of group members to take the floor, such that all other members may continue to listen to the talk spurts but are not able to take the floor. As another example, the dispatcher 500 may allow only a subset of group members to send or originate non-voice media transmissions (e.g., media share, location, text, etc.). As yet another example, the dispatcher 500 may mute the capabilities and/or applications on target members' devices, either at the time the call starts or at some point during the call.

The dispatcher may also define geo-capability control for call restrictions, call type capabilities, and/or location update frequencies, referred to as control zone configuration (CZC). As illustrated in FIGS. 7 and 9 to 11, the UI of the dispatcher 500 displays a map. This map view can trivially define a geofence. Alternatively, as illustrated in FIG. 11, an area within the map view, e.g., area 1122, may be defined as a geofence. The user of the dispatcher 500 may define area 1122, or area 1122 may be defined based on similarities between the members within area 1122 (e.g., device type, device capabilities, applications installed, etc.). In an aspect, only the locations of members within the map view, or geofence, are obtained from a periodic feed of location information from each member, registration information of each member, or the query-response flow illustrated in FIG. 8.

The geofence can also define call type capabilities. For example, when a given member moves into a location covered by the geofence, that member's call type capabilities can be updated. As an example, the dispatcher 500 can define a rule whereby members leaving the geofence area lose their originating capability and keep only their listening capability, while members that enter the geofence area are granted both calling and listening capability.

Figure 12:
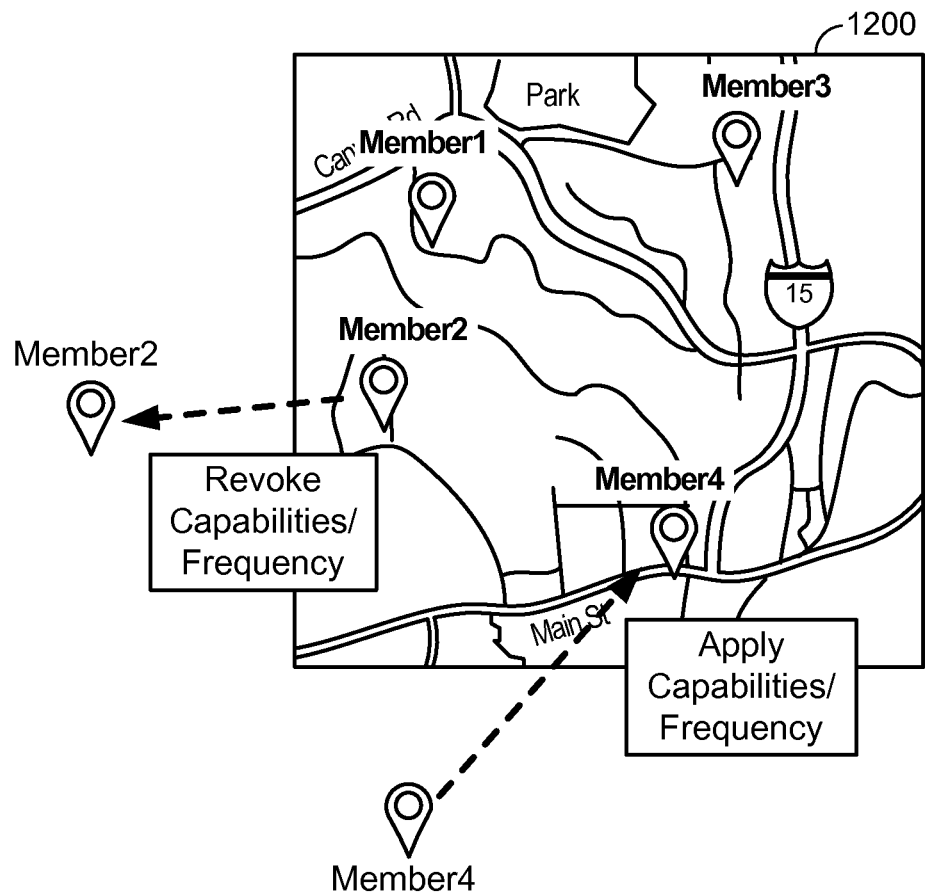
FIG. 12 illustrates an exemplary geofence that various members of a closed group can enter and depart in accordance with an embodiment of the disclosure.

FIG. 12 illustrates an exemplary geofence 1200 that various members of a closed group can enter and depart. The geofence 1200 may correspond to the current map view of dispatcher 500 or a user-defined geofence, for example. As discussed above, the geofence 1200 may have associated call capabilities/restrictions and a specified location update frequency for the group members within geofence 1200. Thus, when a group member moves into the geofence 1200 (e.g., "Member4" in the example of FIG. 12), those call capabilities/restrictions and location update frequency are applied to that member. Conversely, when a give member leaves the geofence (e.g., "Member2" in the example of FIG. 12), the call capabilities/restrictions and location update frequency are revoked for that member.

Group members may also move in and out of a geofence based on the user changing the borders of the geofence. For example, where the current map view corresponds to the geofence and is associated with a CZC, the user may or may not wish to change the call capabilities/restrictions and/or location update frequencies for the members affected by the user changing the map view (e.g., to check other portions of the map) and thereby the geofence. Accordingly, the user may be provided an option to set or lock the current map view such that if the map view is changed, the CZC applicability area is not. In this case, the CZC area could be highlighted on the map with visual boundaries while the user explores map areas around and outside the CZC zone. For example, the CZZ could be displayed as a rectangular box and the user could browse in and out of it to check member locations in the entire service area.

Alternatively, when the user moves around the map, the CZC can move with it and apply to the group members in the new/current map view. This may result in a new set of group members having the current CZC settings applied to them and the set of group members that are no longer in the current map view having those capabilities updated.

The dispatcher 500 can also have different CZC rules or presets for different geofences, which may be defined a priori or on the fly. In this case, there may be a separate control panel that the user uses to define the different CZC zone policies.

When calls are placed, the call type capabilities can be piggybacked in the call setup signaling. When a target member sends its location back to the dispatcher 500, the dispatcher 500 can send a location acknowledgment with the updated call type capability, the value of which is based on whether the target member entered or left the geofence.

Figure 13:
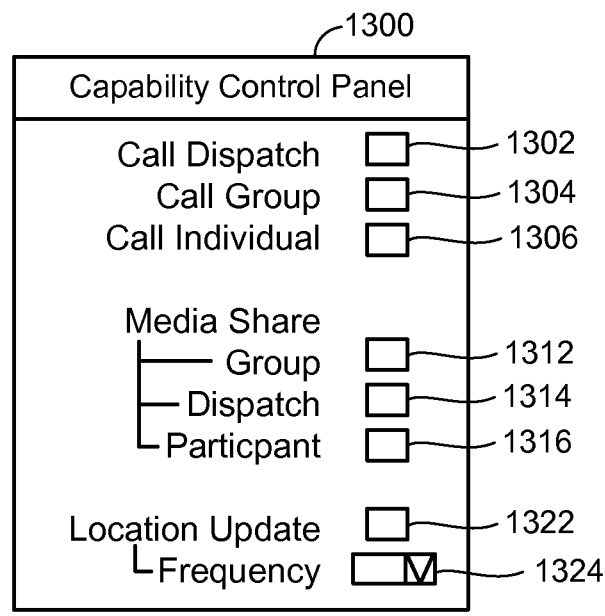
FIG. 13 illustrates an exemplary capability control panel in accordance with an embodiment of the disclosure.

FIG. 13 illustrates an exemplary capability control panel 1300. The capability control panel 1300 may be displayed on the UI of the dispatcher 500 when the user of the dispatcher 500 selects an icon to launch the capability control panel 1300 or selects a geofence, such as area 1122 in FIG. 11 or geofence 1200 in FIG. 12. The capabilities defined in the capability control panel 1300 may apply to all group members of the currently displayed closed group, all group members in the current map view, or only group members within the geofence (if not the entire map view). The dispatcher 500 can set group member capabilities via the capability control panel 1300 either during an active call or when no call is active.

As illustrated in FIG. 13, the capability control panel 1300 includes a number of checkboxes. Checkboxes 1302 to 1306 allow the user to set whether or not the target group members can call the dispatcher 500, the closed group, or individual members within the closed group. Checkboxes 1312 to 1316 allow the user to set whether or not the target group members can share media with the closed group, the dispatcher 500, or individual group members. Checkbox 1322 allows the user to set whether or not the target group members should send location updates to the dispatcher 500. Field 1324 allows the user to specify the frequency of the requested location updates.

Figure 14:
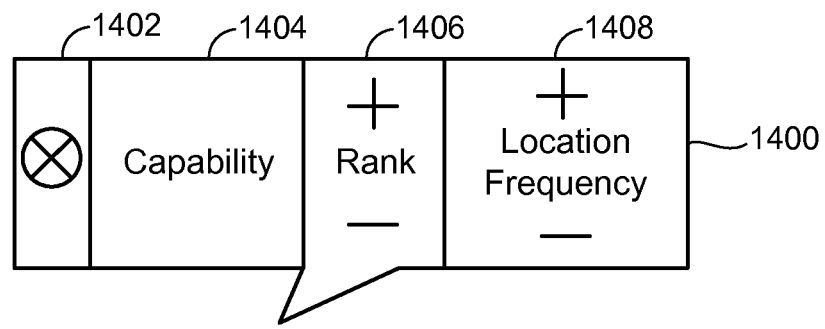
FIG. 14 illustrates an exemplary control panel for an individual group member in accordance with an embodiment of the disclosure.

FIG. 14 illustrates an exemplary control panel 1400 for an individual group member. The dispatcher 500 can display the control panel 1400 when the user the user of the dispatcher 500 selects a particular group member. The user may select the target member during an active group call or when no call is active.

Field 1402 allows the user to remove the target group member from the current call or the closed group. Field 1404 allows the user to view the capability control panel for that particular user, such as capability control panel 1300 in FIG. 13. The user may change capabilities regarding originating and/or participating in group calls. These capability changes can be piggybacked on media or signaling of the current call. Field 1406 allows the user to increase or decrease the target group member's rank with respect to obtaining the floor in a group communication. Field 1408 allows the user to increase or decrease the target group member's location frequency, i.e., the frequency that the target group member sends location updates to the dispatcher 500.

Figure 15:
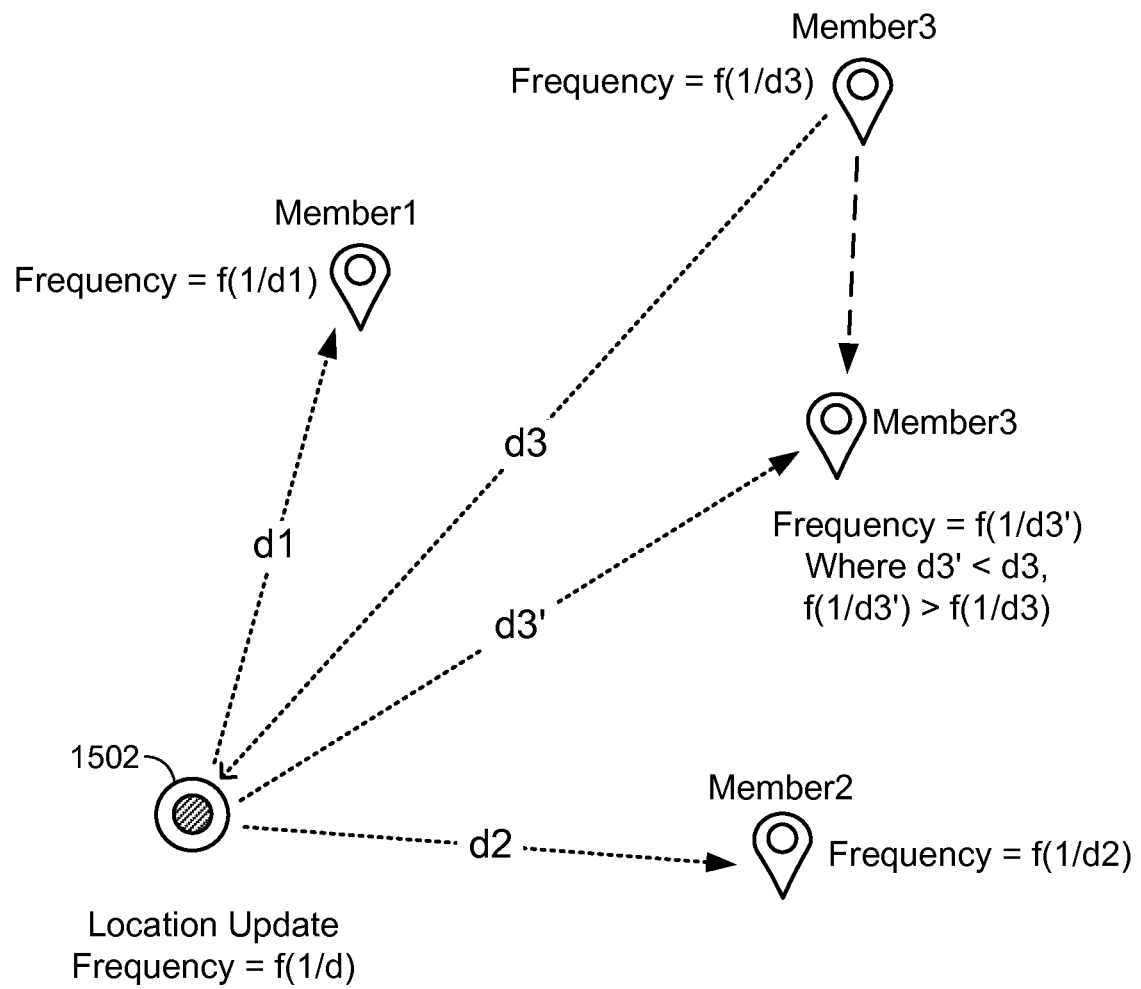
FIG. 15 illustrates exemplary movement of a particular group member from a first location to a second location and the corresponding location update frequency changes in accordance with an embodiment of the disclosure.

The periodicity of location updates can vary in an inversely proportional manner to the distance from a given location, such as the location of the dispatcher 500, the center of the geofence, a key location, a "hot" zone, etc. FIG. 15 illustrates exemplary movement of a particular group member from a first location to a second location and the corresponding location update frequency changes. As illustrated in FIG. 15, a first member of the closed group (i.e., "Member1") and a second member of the closed group (i.e., "Member2") are first and second distances d1 and d2, respectively, from location 1502. Location 1502 may be the location of the dispatcher 500, the center of a geofence, a key location, a "hot" zone, etc. The frequencies of location updates for Member1 and Member2 are f(1/d1) and f(1/d2), respectively.

As illustrated in FIG. 15, a third member of the closed group (i.e., "Member3"), moves from a distance of d3 away from location 1502 to a distance of d3' away from location 1502. Because of the move, the frequency of location updates changes from f(1/d3) to f(1/d3'). Where d3' is less than d3, f(1/d3') will be greater, or more frequent, than f(1/d3).

Figure 16:
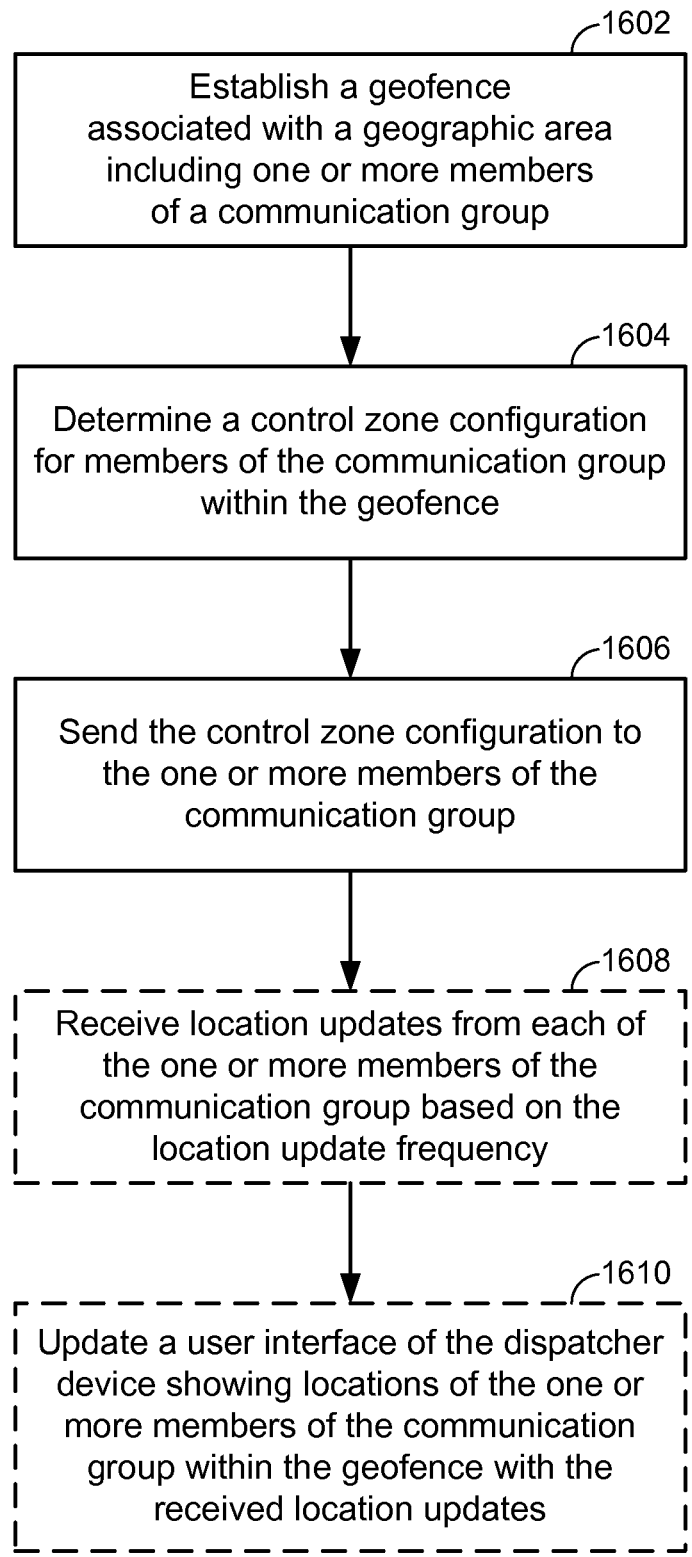
FIG. 16 illustrates an exemplary flow for setting a control zone configuration for members of a communication group in accordance with an embodiment of the disclosure.

FIG. 16 illustrates an exemplary flow for setting a control zone configuration for members of a communication group. The communication group may be a PTT communication group, a PoC communication group, or a PTX communication group, for example. The flow illustrated in FIG. 16 may be performed by a dispatcher device, such as dispatcher 500. The dispatcher device may also be a member of the communication group.

At 1602, the dispatcher device establishes a geofence associated with a geographic area including one or more members of the communication group, such as area 1122 in FIG. 11 and/or geofence 1200 in FIG. 12.

At 1604, the dispatcher device determines the control zone configuration for members of the communication group within the geofence. Determining the control zone configuration may include setting one or more call capabilities and a location update frequency of the members of the communication group. The location update frequency may be based on the distance between a member of the one or more members and a key location and may be an inverse function of the distance between the member of the one or more members and the key location, as described above with reference to FIG. 15. The key location may be the location of the dispatcher device. Setting the one or more call capabilities may include setting an ability to originate a voice call among the members of the communication group, an ability to originate a non-voice media transmission among the members of the communication group, an ability to listen to a voice call among the members of the communication group, an ability to receive a non-voice media transmission from other members of the communication group, and/or an ability to receive floor control during a call among the members of the communication group, as discussed herein.

At 1606, the dispatcher device sends the control zone configuration to the one or more members of the communication group. In addition to setting the one or more call capabilities of the members of the communication group, the control zone configuration may also include instructions for causing at least one member device of the communication group to disable one or more features and/or applications of the at least one member device, as discussed herein.

At 1608, the dispatcher device receives location updates from each of the one or more members of the communication group based on the location update frequency. The one or more members of the communication group may send location updates only to the dispatcher device.

At 1610, the dispatcher device updates a user interface of the dispatcher device showing locations of the one or more members of the communication group within the geofence with the received location updates. Blocks 1608 and 1610 are illustrated with dashed lines because these aspects are not required to be performed in every embodiment of the disclosure.

Although not illustrated in FIG. 16, the dispatcher device may update the geofence, such that after the updating, a subset of the one or more members are no longer within the geofence. In that case, the control zone configuration may be revoked for the subset of the one or more members, as described above with reference to FIG. 12.

Further, although not illustrated in FIG. 16, the dispatcher device may also send a location request to the one or more members of the communication group and display locations of the one or more members of the communication group on a map representing the geofence.

In an aspect, the dispatcher device may be a member of a plurality of communication groups, and the communication group may be a first communication group of the plurality of communication groups. In that case, the dispatcher device may establish a second geofence associated with a geographic area including one or more members of a second communication group of the plurality of communication groups, determine a second control zone configuration for members of the second communication group within the second geofence, and send the second control zone configuration to the one or more members of the second communication group. The dispatcher device may display group information for an active communication group of the plurality of communication groups, as described above with reference to FIG. 7. The group information may include a list of group members of the active communication group and icons for calling a member of the active communication group, sending media to the member of the active communication group, and initiating a location request to the member of the active communication group, as described above with reference to FIG. 11. The group information may also include a list of group members of the active communication group and icons for initiating a group call among the active communication group, sending media to the active communication group, and initiating a location request for the active communication group, as also described above with reference to FIG. 11.

Figure 17:
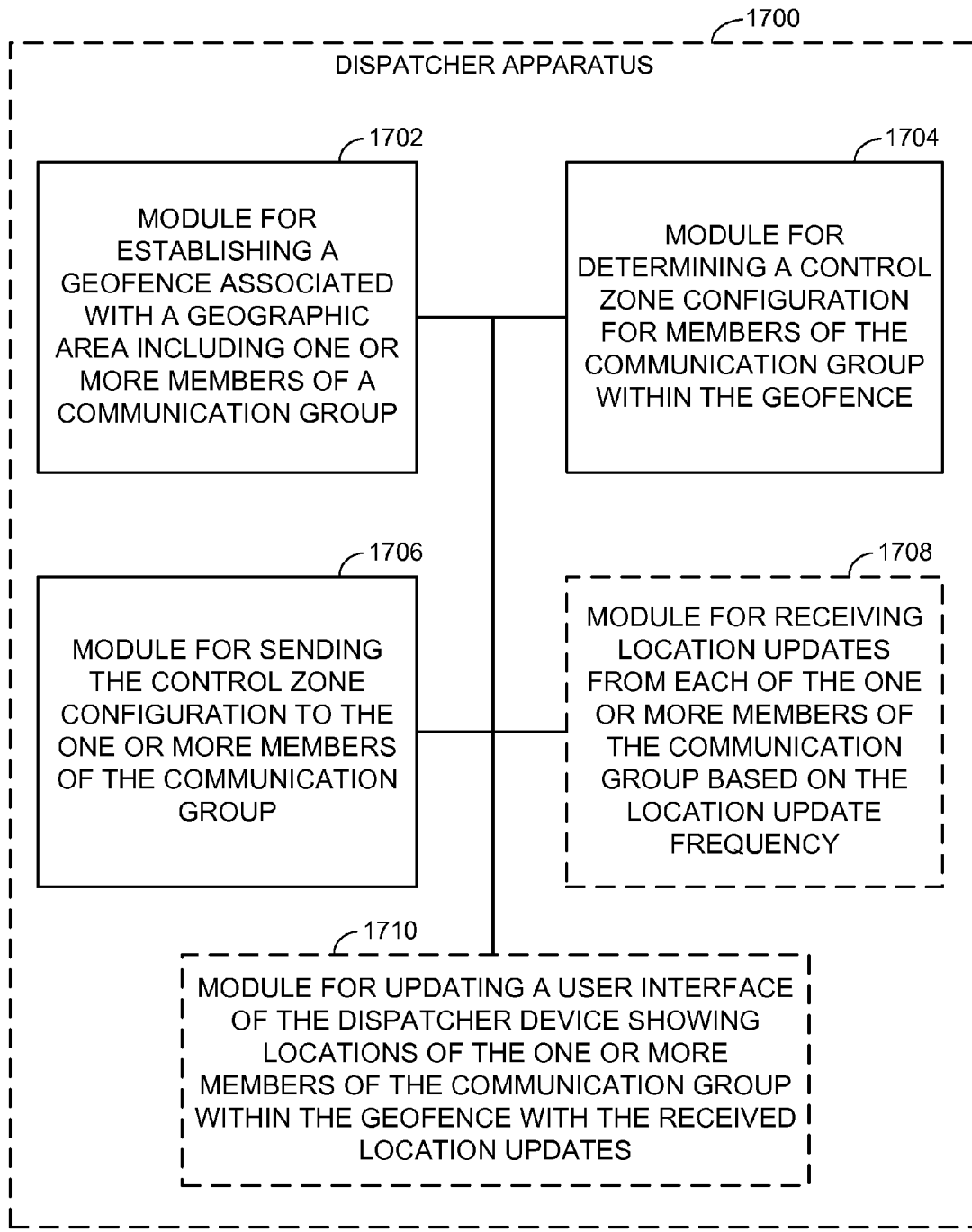
FIG. 17 is a simplified block diagram of several sample aspects of an apparatus configured to support communication in accordance with an embodiment of the disclosure.

FIG. 17 illustrates an example dispatcher apparatus 1700 represented as a series of interrelated functional modules. A module for establishing 1702 may correspond at least in some aspects to, for example, a user interface cooperatively with a processing system, such as the control zone module 216 in conjunction with ASIC 208, as discussed herein. A module for determining 1704 may correspond at least in some aspects to, for example, a processing system, such as the control zone module 216 in conjunction with ASIC 208, as discussed herein. A module for sending 1706 may correspond at least in some aspects to, for example, a processing system, such as the control zone module 216 in conjunction with ASIC 208, cooperatively with a communication system, such as transceiver 206, as discussed herein. A module for receiving 1708 may correspond at least in some aspects to, for example, a communication system, such as transceiver 206, cooperatively with a processing system, such as the control zone module 216 in conjunction with ASIC 208, as discussed herein. A module for updating 1710 may correspond at least in some aspects to, for example, a user interface cooperatively with a processing system, such as the control zone module 216 in conjunction with ASIC 208, as discussed herein. Modules 1708 and 1710 are illustrated with dashed lines because these modules are not required in every embodiment of the disclosure.

The functionality of the modules of FIG. 17 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 17, as well as other components and functions described herein, may be implemented using any suitable means. Such means also may be implemented, at least in part, using corresponding structure as taught herein. For example, the components described above in conjunction with the "module for" components of FIG. 17 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of setting a control zone configuration for a communication group, comprising:
   establishing, by a dispatcher device, a geofence, the geofence associated with a geographic area including one or more members of the communication group;
   determining, by the dispatcher device, the control zone configuration for members of the communication group within the geofence; and
   sending, by the dispatcher device, the control zone configuration to the one or more members of the communication group.

2. The method of claim 1, wherein the communication group comprises a push-to-talk (PTT) communication group, a PTT over cellular (PoC) communication group, or a PTX communication group.

3. The method of claim 1, wherein determining the control zone configuration comprises setting one or more call capabilities and a location update frequency for the members of the communication group.

4. The method of claim 3, wherein the location update frequency is based on a distance between a member of the one or more members and a key location.

5. The method of claim 4, wherein the key location comprises a location of the dispatcher device.

6. The method of claim 4, wherein the location update frequency comprises an inverse function of the distance between the member of the one or more members and the key location.

7. The method of claim 3, further comprising:
receiving location updates from each of the one or more members of the communication group based on the location update frequency; and
updating a user interface of the dispatcher device showing locations of the one or more members of the communication group within the geofence with the received location updates.

8. The method of claim 7, wherein the one or more members of the communication group send location updates only to the dispatcher device.

9. The method of claim 3, wherein setting the one or more call capabilities comprises setting an ability to originate a voice call among the members of the communication group, an ability to originate a non-voice media transmission among the members of the communication group, an ability to listen to a voice call among the members of the communication group, an ability to receive a non-voice media transmission from other members of the communication group, and/or an ability to receive floor control during a call among the members of the communication group.

10. The method of claim 1, wherein the control zone configuration comprises instructions for causing at least one member device of the communication group to disable one or more features and/or applications of the at least one member device.

11. The method of claim 1, further comprising:
updating the geofence, wherein after the updating, a subset of the one or more members are no longer within the geofence, and
wherein the control zone configuration is revoked for the subset of the one or more members.

12. The method of claim 1, wherein the dispatcher device is a member of the communication group.

13. The method of claim 1, wherein the dispatcher device is a member of a plurality of communication groups, and wherein the communication group is a first communication group of the plurality of communication groups.

14. The method of claim 13, further comprising:
establishing a second geofence, the second geofence associated with a geographic area including one or more members of a second communication group of the plurality of communication groups;
determining a second control zone configuration for members of the second communication group within the second geofence; and
sending the second control zone configuration to the one or more members of the second communication group.

15. The method of claim 13, further comprising:
displaying group information for an active communication group of the plurality of communication groups.

16. The method of claim 15, wherein the group information comprises a list of group members of the active communication group and icons for calling a member of the active communication group, sending media to the member of the active communication group, and initiating a location request to the member of the active communication group.

17. The method of claim 15, wherein the group information comprises a list of group members of the active communication group and icons for initiating a group call among the active communication group, sending media to the active communication group, and initiating a location request for the active communication group.

18. The method of claim 1, further comprising:
sending a location request to the one or more members of the communication group; and
displaying locations of the one or more members of the communication group on a map representing the geofence.

19. An apparatus for setting a control zone configuration for a communication group, comprising:
a processor configured to establish a geofence, the geofence associated with a geographic area including one or more members of the communication group, and to determine the control zone configuration for members of the communication group within the geofence; and
a transceiver configured to send the control zone configuration to the one or more members of the communication group.

20. The apparatus of claim 19, wherein the communication group comprises a push-to-talk (PTT) communication group, a PTT over cellular (PoC) communication group, or a PTX communication group.

21. The apparatus of claim 19, wherein the processor being configured to determine the control zone configuration comprises the processor being configured to set one or more call capabilities and a location update frequency for the members of the communication group.

22. The apparatus of claim 21, wherein the location update frequency is based on a distance between a member of the one or more members and a key location.

23. The apparatus of claim 21, wherein the transceiver is further configured to receive location updates from each of the one or more members of the communication group based on the location update frequency, and
wherein the processor is further configured to update a user interface of a dispatcher device showing locations of the one or more members of the communication group within the geofence with the received location updates.

24. The apparatus of claim 21, wherein the processor being configured to set the one or more call capabilities comprises the processor being configured to set an ability to originate a voice call among the members of the communication group, an ability to originate a non-voice media transmission among the members of the communication group, an ability to listen to a voice call among the members of the communication group, an ability to receive a non-voice media transmission from other members of the communication group, and/or an ability to receive floor control during a call among the members of the communication group.

25. The apparatus of claim 19, wherein the control zone configuration comprises instructions for causing at least one member device of the communication group to disable one or more features and/or applications of the at least one member device.

26. The apparatus of claim 19, wherein the processor is further configured to update the geofence, wherein after the geofence is updated, a subset of the one or more members are no longer within the geofence, and herein the control zone configuration is revoked for the subset of the one or more members.

27. The apparatus of claim 19, wherein the apparatus is a member of the communication group.

28. The apparatus of claim 19, wherein the apparatus is a member of a plurality of communication groups, and wherein the communication group is a first communication group of the plurality of communication groups.

29. An apparatus for setting a control zone configuration for a communication group, comprising:
- means for establishing a geofence, the geofence associated with a geographic area including one or more members of the communication group;
- means for determining the control zone configuration for members of the communication group within the geofence; and
- means for sending the control zone configuration to the one or more members of the communication group.

30. A non-transitory computer-readable medium for setting a control zone configuration for a communication group, comprising:
- at least one instruction to cause a dispatcher device to establish a geofence, the geofence associated with a geographic area including one or more members of the communication group;
- at least one instruction to cause the dispatcher device to determine the control zone configuration for members of the communication group within the geofence; and
- at least one instruction to cause the dispatcher device to send the control zone configuration to the one or more members of the communication group.

* * * * *